Nov. 22, 1966 B. BRIGHTMAN ET AL 3,287,499

CONFERENCE CIRCUIT

Filed July 1, 1963

INVENTORS.
BARRIE BRIGHTMAN
DONALD C. RIMLINGER
BY George J. Seligsohn
ATTORNEY

United States Patent Office 3,287,499

Patented Nov. 22, 1966

3,287,499

CONFERENCE CIRCUIT

Barrie Brightman, Webster, and Donald C. Rimlinger, Holcomb, N.Y., assignors, by mesne assignments, to Stromberg-Carlson Corporation, Rochester, N.Y., a corporation of Delaware Filed July 1, 1963, Ser. No. 291,681
3 Claims. (Cl. 179—1)

Figures 1, 2:
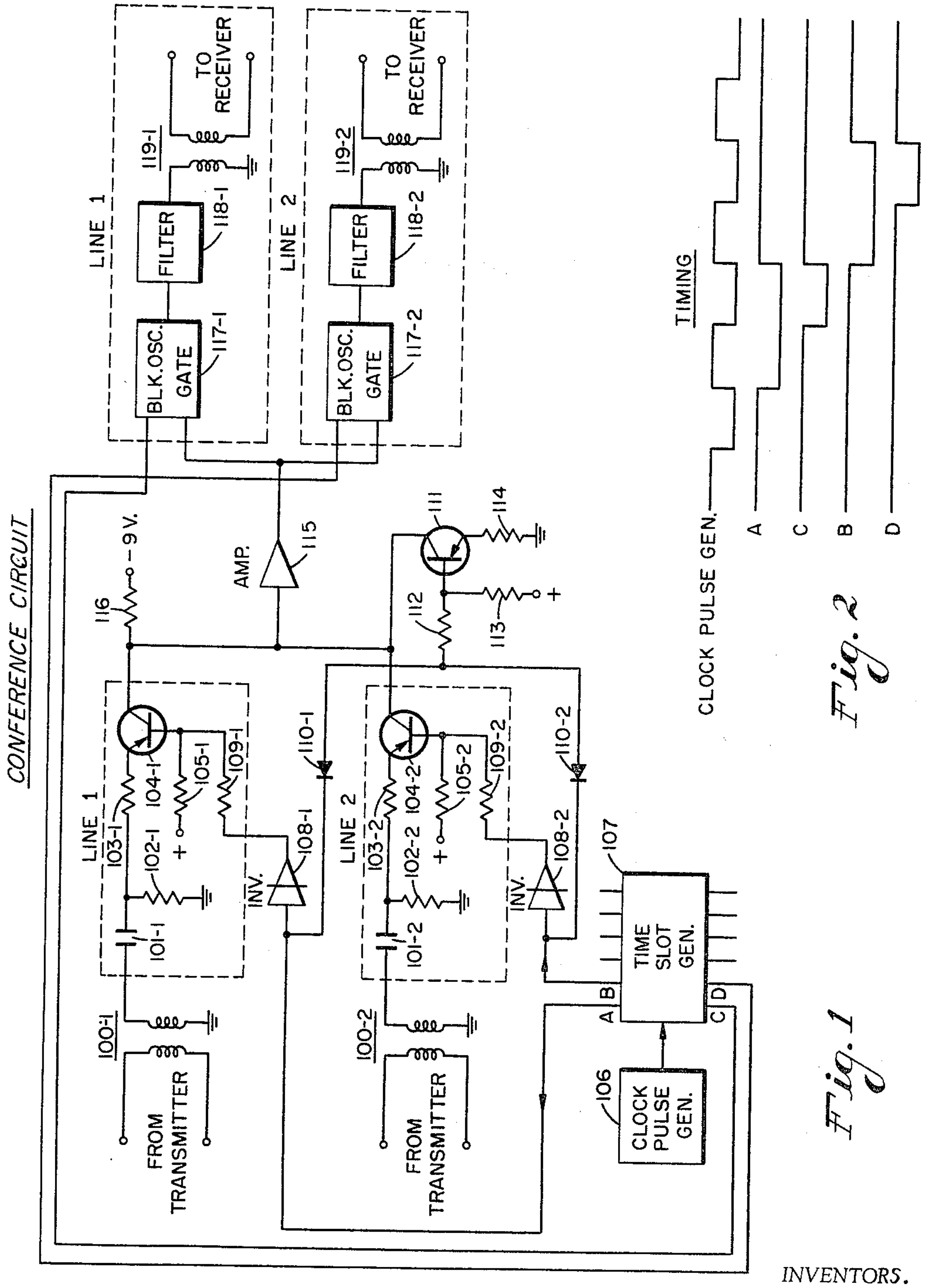

This invention relates to a conference circuit and, more particularly, to a large conference circuit for a communication system such as a telephone system.

Conference circuits for communications systems such as telephone systems, which permit a connection to be set up among three or more different parties on separate lines, are well known. However, in the past the size of the conference which could be set up was limited to a relatively small number of parties. This is true because, without amplification the power provided by each telephone transmitted is sufficient to simultaneously transmit speech to only a relatively few other telephones, while when sufficient amplification is utilized to permit a conference of large number of telephones to be set up, excessive sidetone and the likelihood of acoustic feedback in each telephone results.

The conference circuit contemplated by the present invention provides amplification sufficient for a large conference (up to or exceeding 100 telephones) to be supplied by a common amplifier and yet prevents excessive sidetone and the likelihood of acoustic feedback from taking place in any telephone. This is accomplished by time dividing the output of the amplifier among the receiving portions of the various telephones in a conference and blocking the transmission portion of each telephone during the interval in which the output of the amplifier is coupled to the receiving portion thereof.

It is therefore an object of the present invention to provide a large conference circuit.

It is a further object of the present invention to provide a large conference circuit utilizing a common amplifier.

It is a further object of the present invention to provide a large conference circuit in which excessive sidetone and the likelihood of acoustic feedback is prevented.

These and other objects, features and advantages of this invention will become apparent from the following description taken together with the accompanying drawing in which;

FIG. 1 is a schematic circuit diagram of the preferred embodiment of the invention and, FIG. 2 is a timing chart helpful in describing the operation of the invention.

Referring to FIG. 1, the conference circuit comprises a large number, such as 100 identical individual input and output means, (only the first and second of which are shown) associated with the transmitting and receiving portions of each line.

More particularly, an individual input means input transformer, such as transformer 100–1 or 100–2, has its primary winding coupled to the transmitting portion of the line individual thereto. The secondary winding of the input transformer is coupled through a blocking capacitance, such as capacitances 101–1 or 101–2, to a shunt resistance, such as resistance 102–1 or 102–2, and through a series resistance, such as resistance 103–1 or 103–2, to the emitter of an input gate PNP transistor, such as transistor 104–1 or 104–2. A resistance, such as resistance 105–1 or 105–2, connects the base of the transistor to a point of positive potential.

Clock pulse generator 106 applies periodic clock pulses as an input to time slot generator 107. Time slot generator 107 includes a ring-connected counter operated by the clock pulses applied thereto and associated logic circuitry to provide a repetitive time frame which includes a separate time slot for each of the different lines of the conference circuit. More particularly, as shown in FIG. 2, time slot generator 107 provides a first set of outputs, such as A, B . . ., each of which has a duration equal to a different entire clock pulse period during each time frame, and a second set of outputs, such as C, D . . ., each of which has a duration equal to only the negative portion of a separate clock pulse period during each time frame.

As shown in FIG. 1, each of the first set of outputs of time slot generator 107, such as output A or B, is applied through an inverter, such as inverter 108–1 or 108–2, and a resistance, such as resistance 109–1 or 109–2, to the base of a corresponding input gate transistor, such as transistor 104–1 or 104–2. Also each of the first set of outputs of time slot generator 107 is individually coupled through a respective diode, such as diode 110–1 or 110–2, which is poled to be normally nonconducting, to a common point which is connected to the base of common gate transistor 111 through resistance 112. The base of common gate transistor 111 is also connected to a point of positive potential through resistance 113. The emitter of common gate transistor 111 is connected to a point of reference potential through resistance 114.

The collectors of each of the input gate means and the common gate means are connected in multiple directly to the input of common amplifier 115 and through resistance 116 to a point of negative potential.

The output of common amplifier 115 is connected as a first input to each of normally closed blocking oscillator gates, such as blocking oscillator gate 117–1 and 117–2, each of which is associated with a different line. Each of the second set of outputs of time slot generator 107, such as outputs C, D . . ., is individually connected as a second input to a separate blocking oscillator gate, such as blocking oscillator gate 117–1 or 117–2. The output of each blocking oscillator gate, such as blocking oscillator gate 117–1 or 117–2, is applied as an input to a low-pass filter, such as filter 118–1 or 118–2, associated with each line. The output of each low-pass filter, such as filter 118–1 or 118–2, is applied through an individual output transformer, such as 119–1 or 119–2, to the receiving portion of the line with which it is associated.

Referring now to the operation of the conference circuit disclosed in FIG. 1, it will be seen that each of the input gate transistors, such as input gate transistor 104–1 or 104–2, is maintained normally conducting. Therefore, a resultant output signal from the transmitting portions of all the lines combined will tend to be derived across resistance 116 and applied as an input to common amplifier 115.

The frequencies generated by clock pulse generator 106 is sufficiently high such that the repetition rate of the time derived by time slot generator 107 is greater than twice the highest frequency component of any signal to be transmited by any line through the transmitting circuit.

It will be seen that during each time frame each normally conducting input transistor, such as transistor 104–1 or 104–2, will be successively blocked for one entire time slot period, thereby causing the transmitted signal from the line with which that transistor is associated to be absent from the input to common amplifier 115 during that time slot of each time frame during which that transistor is blocked. However, the transmitted signal from the transmitting portion of all the other lines will still be present at the input to common amplifier 115.

In order to prevent the blocking of input gate transistor from causing a voltage step at the input to common amplifier 115, normally non-conducting common gate transistor 111 is rendered conducting in response to the blocking of any of input gate transistors. This is true because each of the input gate transistors, such as transistor 104–1 or 104–2, and common gate transistor 111, when conducting, present the same given impedance at the input of common amplifier 115, so that the resultant total impedance at the input of common amplifier 115 does not change when one of the input gate transistors, such as transistor 104–1 or 104–2, is blocked or common gate transistor 111 is simultaneously rendered conducting.

Since the normally closed blocking oscillator gate, such as blocking oscillator 117–1 or 117–2, associated with any line is opened only during the negative portion of the time slot in which the input gate transistor, such as transistor 104–1 or 104–2, of that line is blocked, the output signal from common amplifier 115, which is sampled by that blocking oscillator gate when opened, does not include the signal being transmitted by that line, but includes the signals being transmitted at that instant by all the other lines.

The low-pass filter, such as filter 118–1 or 118–2, associated with each line as an upper cut-off frequency which is higher than the highest frequency component to be transmitted, but lower than the time frame repetition rate. Therefore, each low-pass filter, such as filter 118–1 or 118–2, will integrate the samples received from the blocking oscillator gate, such as blocking oscillator gate 117–1 or 117–2, to which it is coupled, and apply the integrated output through the output transformer, such as transformer 119–1 or 119–2, to the receiving portion of the line with which it is associated.

It will be seen that the signal applied to the receiving portion of any line includes the signals transmitted by all the other lines in the conference, but does not include the signal transmitted by the transmitting portion of the line individual thereto. Therefore, no excessive sidetone or the likelihood of acoustic feedback will exist, although a common amplifier is utilized to provide sufficient amplification for a large plurality of lines (up to 100 or more). It will be further seen that the maximum number of lines which may be included in a conference depends solely on the frequency of the clock pulse generator with respect to the highest frequency component included in any signal to be transmitted.

By the use of suitable logic circuitry, a plurality of separate simultaneous smaller conferences may be established by maintaining the input gate transistor associated with any line non-conducting except during the time slots assigned to those other lines included in the same conference as that line.

Although only a preferred embodiment of the invention has been described herein, it is not intended that the invention be restricted thereto but that it be limited only by the true spirit and scope of the appended claims.

What is claimed is:

1. A conference circuit for a plurality of lines, each of said lines having a transmitting portion for transmitting a signal and a receiving portion for receiving a signal; said conference circuit comprising a common amplifier; a plurality of individual input means each of which includes input gate means for normally individually applying the signal from the transmitting portion of the line of a conference as a common input to said amplifier; a plurality of individual output means each of which includes a low-pass filter, normally closed output gate means responsive to the opening thereof for applying the common output of said amplifier to the input of said filter, and means for individually applying the output of said filter to the receiving portion of a separate one of said lines; time slot generating means for generating a different time slot for each of said lines which recur in a repetitive time frame having a repetition rate which is greater than twice the highest frequency component of any signal to be transmitted, and time slot coupling means for blocking the input gate means and opening the output gate means individual to each line during the time slot which is individual thereto; the upper cut-off frequency of said low-pass filter being between said time frame repetition rate and said highest frequency.

2. The conference circuit defined in claim 1, wherein each of said input gate means when open presents the same given impedance at the input of said amplifier, and further including a normally closed common gate means coupled to the input of said amplifier, said common gate means when open presenting said given impedance at the input of said amplifier, and means responsive to the closing of any of said input gate means for opening said common gate means.

3. The conference circuit defined in claim 1, wherein said time slot generating means and said time slot coupling means include means for closing each input gate means for an entire time slot each time frame and means for opening each output gate means only for the terminal portion of a time slot each time frame.

References Cited by the Examiner

UNITED STATES PATENTS

| | | | |
|---|---|---|---|
| 2,199,179 | 4/1940 | Koch | 179—1 |
| 2,515,726 | 7/1950 | Montani | 179—1.4 |

KATHLEEN H. CLAFFY, *Primary Examiner.*

R. M. GOLDMAN, *Assistant Examiner.*